Dec. 15, 1925.                                                    1,566,008
C. G. HINRICHS
METHOD OF TREATING CRUDE OIL OR PETROLEUM
Filed Nov. 23, 1918
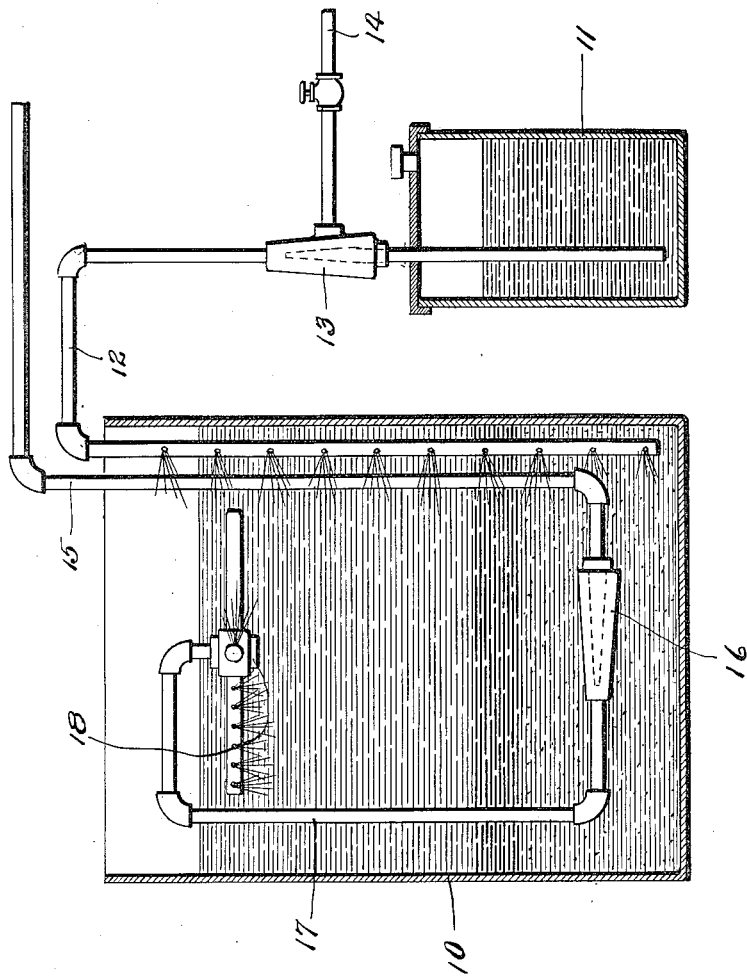
Inventor
Carl G. Hinrichs Patented Dec. 15, 1925.

1,566,008

UNITED STATES PATENT OFFICE.

CARL G. HINRICHS, OF ST. LOUIS, MISSOURI.

METHOD OF TREATING CRUDE OIL OR PETROLEUM.

Application filed November 23, 1918. Serial No. 263,896.

*To all whom it may concern:*

Be it known that I, CARL G. HINRICHS, a citizen of the United States, residing at St. Louis, Missouri, have invented a certain new and useful Method of Treating Crude Oil or Petroleum, of which the following is a full, clear, and exact description, such as will enable others skilled in the art to which it appertains to make and use the same, reference being had to the accompanying drawings, forming part of this specification.

My invention relates to a new and useful method or process of treating certain crude oils which, when drawn from the earth, contain a certain percent or content of waste substance or matter foreign to marketable petroleum, the principal object of my invention being to provide a practicable and inexpensive method or process for separating from so-called roily oils or natural petroleum, practically all the oil suitable for commercial uses.

In certain localities or oil fields, the crude oil taken from the ground contains brine and other foreign matter, the volume of which very frequently exceeds the limit or commercial allowance established for acceptance by pipe line operators or refiners. In certain fields, this volume of foreign matter runs as high as fifty percent and pipe lines refuse to accept crude oil containing over three percent of foreign matter. Where the crude oil is acceptable it is very frequently stored for a considerable period of time in tanks where a portion of the foreign matter separates from the merchantable oil by gravitating to the bottom of the tank and where such action takes place, the accumulation of foreign substance is in the form of a relatively thick, brown-colored, salve-like mass, and is generally known as bottom settlings. This mass contains a high percent of petroleum, in addition to brine, organic matter, and very frequently silt, and obviously on large tank farms, the mass accumulates in large quantities and much time, labor and consequently expense is involved in getting rid of it.

Wells in certain fields produce what is known as roily oil, that is, oil which contains a sufficient percentage of foreign substance to give it a roily appearance. This oil may by the ordinary settling process result in a considerable portion of good merchantable petroleum, or by simply heating the oil an increased amount of marketable product may be produced, but these methods have not in practice proven satisfactory and the storage of large quantities of oil involves the investment of considerable capital in storage tanks and oil handling equipment.

Under the microscope, the so-called bottom settlings appear as an emulsion. The water or brine mixed with the emulsion appears to greatly influence the stability of the latter. Some brines I have found are slightly alkaline in their nature due to loss of carbonic acid from the bicarbonates of the brine and presence of phosphates and silicates of the alkalies contained therein. By the treatment of bottom settlings with a salt having a slight acid reaction, as, for instance, the so-called bi-salts or mono sodium phosphate, a separation of the oil from the foreign substances is possible. In practice I have separated oil in the manner just described and upon alkalinizing the mass, the same has again become roily. This indicates that the permanence of such emulsions depend greatly on the slight alkalinity or acidity of the brines, which latter conditions may be due to bicarbonates or to the acids occurring in some petroleums having a composition similar to oleic acid. Thus it is evident that the alkalinity of the emulsion may be overdone and the object of separation defeated.

Some oils may be treated by nitrates, for instance, aluminum nitrates, and a separation effected by warming the mass to reduce its viscosity or a sufficient amount of alkali may be added to form the aluminate of the alkali metal and its nitrate, and separation thus effected.

In experiments I have used ethyl sulphates, salts of amyl sulphuric acid, sodium potassium or ammonium cyanides, fluosilicates, phosphates, fluoborates, and borates in treating the bottom settlings either in slightly acid or alkaline conditions of the mass in effecting the desired separation. To be more specific, I have used the sodium calcium salts of ethyl sulphuric acid, formerly known as sulphovinic acid, which acid, $SO_4(C_2H_5)H$ results from the action of sulphuric acid on alcohol. This acid neutralized with sodium carbonate gives sodium ethyl sulphate $NA(C_2H_5)SO_4$ and when neutralized with lime gives calcium ethyl sulphate $Ca[(C_2H_5)SO_4]_2$. I have also used the calcium and sodium salts of amyl sulphuric acid $SO_4(C_5H_{11})H$, the calcium salt having the formula $Ca[SO_4(C_5H_{11})]_2$ and the sodium salt having the formula $NaSO_4$-$(C_5H_{11})$.

I have also used ethyl sulphuric acid to form a potassium salt having the formula $K(C_2H_5)SO_4$ which is effective upon certain roily oils.

I have also found that acid sodium phosphate $(NaH_2PO_4)$ and acid calcium phosphate $(CaH_4(PO_4)_2)$ each neutralizes the sodium carbonate of the brine dissolving the brine acids which hold the emulsion together.

I have also used sulphocyanides produced by potassium and lime salts, KCNS and $Ca(CNS)_2$, respectively. Since the emulsion often results from the presence of mineral iron salts, usually basic, when such emulsions are treated with sulphocyanides either of lime or the alkalis, sulphocyanide of iron is formed which is soluble not only in the brine but also in the oil. This partial solubility of the iron in both liquids gives a clear clean separation of the brine from the oil without any deposit of iron salts between the two. The salts of amyl sulphuric or ethyl sulphuric acids act similarly to form corresponding soluble iron salts.

All of the above mentioned salts may be applied to the oil either as powder or in solution.

I have also found that halogen addition products of such liquid fatty acids as ricinoleic acid or oleic acid have the same properties and that in some cases the acid as such may be employed and in other cases the acids may be brominated or chlorinated to produce salts, which actions increase the value of the compounds for reducing the viscosity of the medium and effecting a separation of the oil. The formation of the chlorine addition product of oleic acid may be expressed by the formula $C_{18}H_{32}O_2Cl_2$ and this plus sodium (NaOH) will give the salt of chlorine addition product $NaC_{18}H_{32}O_2Cl_2(H_2O)$. Likewise I have used halogen substitute products of rosin. Unsaturated fatty acids of relatively high molecular weight have a reducing effect on the surface tension existing between the minute globules and the brine medium, and by forming the substitution products of unsaturated fatty acids this reduction of the surface tension can be increased. This method is very economical by virtue of the fact that chlorine costs less to produce than oleic or other fatty non-saturated acid and the consumption of alkali is reduced per unit of salt produced.

In practicing my invention, I dissolve in water, preferably hot, the agent determined upon as cheapest and best suited for the particular oil; then warm the oil to approximately the desired temperature, which latter is developed by experiment, then inject the hot solution in the amount of about two or three percent and agitate the mass with air, steam, natural gas, mechanically or by pumping the oil from the top of the tank or container and injecting it into the top or vice versa.

In some instances, the agent can be dissolved in carbon tetrachloride, in which instance, it may be found desirable to incorporate therewith oils, waxes, higher alcohols such as are obtained from waxes, fusel oil, oils obtained in distillation of coal or in the production of oil gas, and where such practice occurs the viscosity of the petroleum is greatly influenced due to the reducing of the melting point of some of the higher boiling fractions contained in said petroleum. In such instances, I find it desirable to place the solution on the surface of the oil to be treated, and under such conditions I have noted that the oil in many instances, breaks gradually without warming.

In the drawings, I have shown a diagrammatic view partly in section of an apparatus designed for carrying out my improved method, and referring by numerals to said drawings, 10 designates a tank or container for the oil, and 11 the tank or container for the composition to be utilized in treating the oil. Leading from the tank 11 into the oil tank 10 is a pipe 12, the length of which within the oil tank is perforated in order that the composition from said tank 11 will be discharged into the oil tank in jet form.

Located in pipe 12 is an injector 13 to which leads a pipe 14 from a suitable source of steam supply. Leading from a source of steam supply downwardly into oil tank 10 is a pipe 15 and said pipe leads to a steam injector 16 which is located in the bottom of said tank 10. Leading from said injector 16 upwardly within tank 10 is a pipe 17, the same terminating in the upper portion of said oil tank.

Mounted for rotation on the end of this pipe 17 is a spray device 18, preferably of that type which is propelled or rotated by the force of the jets issuing therefrom.

When this form of apparatus is utilized, steam is admitted to pipe 14 connected to the injector 13 and the action of the latter draws the treating agent from tank 11 and forces the same through pipe 12, said agent being discharged from the apparatus in the leg of said pipe in oil tank 10. Thus the treating agent is heated and introduced into the body of oil contained in tank 10 and when steam is turned on through pipe 15, it will discharge into the injector 16, thereby drawing the oil and the treating agent into said injector and the steam heated mixture will now pass through pipe 17 and be discharged from the jet openings in the arms of rotary spray device 18. In this manner, the treating agent is thoroughly mixed and commingled with all of the oil in container 10 and acts upon the molecules of said oil to aid in the separation of the foreign substance from the commercially pure oil. The steam is now cut off from pipes 14 and 15 and the oil in tank 10 is permitted to stand for a certain length of time, whereupon the commercially pure oil will rise to the top while the silt, brine, and other foreign matter will settle to the bottom. Between the body of oil and silt and brine will accumulate a relatively thin stratum of organic matter. The relatively pure oil can now be drawn from tank 10 leaving in the bottom thereof the organic matter and silt and brine from which practically all of the oil has been extracted.

I do not wish to be understood as limiting myself to the exact form of apparatus, herein shown and described, for practicing my improved method, for obviously the method may be carried out with various other forms of apparatus, the only essential feature being a thorough commingling of the treating agent with the oil or material to be treated and permitting the latter to stand until separation has taken place.

Having thus described my invention, what I claim is:

1. The hereindescribed method of treating bottom settlings to separate the oil therefrom consisting in mixing with said bottom settlings a solution of halogen addition products of a liquid fatty acid in carbon tetrachloride, and then warming the mass until the oil separates and rises to the top.

2. The hereindescribed method of treating bottom settlings to separate the oil therefrom consisting in mixing with said bottom settlings a solution of a halogen addition product of a liquid fatty acid in carbon tetrachloride, and then permitting the mass to stand until the oil separates, and rises to the top.

3. The hereindescribed process of treating natural petroleum emulsions which consists in thoroughly mixing therewith a chlorine addition product of a liquid fatty acid in sufficient quantity to effect a separation of the oil from the brine and foreign matter of the emulsion.

4. The hereindescribed process of treating natural petroleum emulsions which consists in thoroughly mixing therewith a salt of a chlorine addition product of a liquid fatty acid in sufficient quantity to effect a separation of the oil from the brine and foreign matter of the emulsion.

5. The hereindescribed method of treating petroleum emulsions which consists in thoroughly mixing therewith a chlorine addition product of a ricinoleic acid in sufficient quantity to effect a separation of the oil from the brine and foreign matter of the emulsion.

6. The method of treating petroleum emulsions which consists in mixing therewith a halogen addition product of ricinoleic acid in sufficient quantity to effect a separation of the oil from the brine and foreign matter of the emulsion.

In testimony whereof I hereunto affix my signature this 20th day of November, 1918.

CARL G. HINRICHS.